US009916464B2

(12) United States Patent
Asthana et al.

(10) Patent No.: US 9,916,464 B2
(45) Date of Patent: Mar. 13, 2018

(54) REPLACEMENT TEXT FOR TEXTUAL CONTENT TO BE PRINTED

(71) Applicant: Hewlett-Packard Development Company, L.P., Houston, TX (US)

(72) Inventors: Prashant Asthana, Bangalore (IN); Vipul Garg, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 101 days.

(21) Appl. No.: 15/116,077

(22) PCT Filed: Feb. 3, 2014

(86) PCT No.: PCT/US2014/014479
§ 371 (c)(1),
(2) Date: Aug. 2, 2016

(87) PCT Pub. No.: WO2015/116235
PCT Pub. Date: Aug. 6, 2015

(65) Prior Publication Data
US 2017/0168998 A1    Jun. 15, 2017

(51) Int. Cl.
*G06F 21/60* (2013.01)
*G06F 17/22* (2006.01)
(Continued)

(52) U.S. Cl.
CPC .......... *G06F 21/608* (2013.01); *G06F 3/12* (2013.01); *G06F 17/21* (2013.01); *G06F 17/22* (2013.01); *G06F 17/2205* (2013.01)

(58) Field of Classification Search
CPC .................................................... G06F 21/608
See application file for complete search history.

(56) References Cited

U.S. PATENT DOCUMENTS

| 4,829,568 | A | * | 5/1989 | Clark | ..................... | G06K 1/121 |
| | | | | | | 101/71 |
| 6,088,684 | A | * | 7/2000 | Custy | ..................... | G06Q 40/02 |
| | | | | | | 705/35 |

(Continued)

FOREIGN PATENT DOCUMENTS

| KR | 101287179 A | 7/2013 |
| WO | WO-2013048509 A1 | 2/2004 |
| WO | WO-2013062531 A1 | 5/2013 |

OTHER PUBLICATIONS

Fuwa et al.; A Secure Printing System for Ubiquitous Network; Published in: TENCON 2005 2005 IEEE Region 10; Date of Conference: Nov. 21-24, 2005; IEEE Xplore (Year: 2005).*

(Continued)

*Primary Examiner* — Bradley Holder
(74) *Attorney, Agent, or Firm* — HP Inc. Patent Department

(57) ABSTRACT

Examples disclosed herein relate to replacement text for textual content to be printed. Examples include a covert version of a document including textual content to be printed, the covert version including replacement text having, for each character of a plurality of first characters of the textual content, a corresponding second character having a different semantic meaning than the first character. The covert version also includes an encrypted representation of the textual content.

13 Claims, 3 Drawing Sheets

(51) Int. Cl.
*G06F 3/12* (2006.01)
*G06F 17/21* (2006.01)

(56) References Cited

U.S. PATENT DOCUMENTS

| | | | | |
|---|---|---|---|---|
| 6,378,070 | B1* | 4/2002 | Chan | G06F 21/608 380/255 |
| 6,711,677 | B1* | 3/2004 | Wiegley | H04L 9/3236 713/151 |
| 7,003,667 | B1* | 2/2006 | Slick | G06F 21/608 380/243 |
| 7,576,883 | B2 | 8/2009 | Ragnet et al. | |
| 7,770,022 | B2 | 8/2010 | Ferlitsch et al. | |
| 8,271,776 | B2 | 9/2012 | Revel et al. | |
| 8,302,001 | B2* | 10/2012 | Mitsui | G06F 17/211 705/51 |
| 8,310,703 | B2 | 11/2012 | Nuggehalli et al. | |
| 8,347,398 | B1 | 1/2013 | Weber | |
| 2002/0065729 | A1 | 5/2002 | Guillemin | G06F 21/608 705/24 |
| 2003/0011810 | A1* | 1/2003 | Strobel | G06F 21/608 358/1.15 |
| 2003/0081247 | A1* | 5/2003 | Sharma | G06F 21/608 358/1.15 |
| 2003/0090712 | A1* | 5/2003 | Lenz | G06F 3/1205 358/1.15 |
| 2003/0105963 | A1* | 6/2003 | Slick | G06F 21/608 713/171 |
| 2005/0197967 | A1* | 9/2005 | Booth | G06F 21/608 705/62 |
| 2005/0289346 | A1* | 12/2005 | Minagawa | G06F 21/608 713/171 |
| 2006/0050879 | A1* | 3/2006 | Iizuka | G06F 21/608 380/51 |
| 2008/0235512 | A1 | 9/2008 | Minagawa | |
| 2009/0063860 | A1* | 3/2009 | Barnett | H04L 63/0442 713/171 |
| 2010/0111301 | A1 | 5/2010 | Wanderley | |
| 2013/0027739 | A1* | 1/2013 | Gilg | G06F 21/608 358/1.15 |
| 2013/0194634 | A1 | 8/2013 | Sankaranarasimhan et al. | |

OTHER PUBLICATIONS

Xiaodong et al.; Security System for Internal Network Printing; Published in: Computational Intelligence and Security (CIS), 2012 Eighth International Conference on; Date of Conference: Nov. 17-18, 2012; IEEE Xplore (Year: 2012).*

Microsoft, "Fonts," MS Windows NT Workstation 4.0 Resource Guide, Chapter 8, retrieved Dec. 9, 2013, <http://technet.microsoft.com/en-us/library/cc750361.aspx>, 22 pages.

Microsoft, "How Network Printing Works," Mar. 28, 2003, <http://technet.microsoft.com/en-us/library/cc783789(v=ws.10).aspx>, 14 pages.

Thinprint, "Cortado's strategic cloud printing solution," (Web Page), Nov. 5, 2010, available at http://www.thinprint.com/Topics/CloudPrinting.aspx, 2 pages.

Wikipedia, "Advanced Encryption Standard," Dec. 6, 2013, <http://en.wikipedia.org/wiki/Advanced_Encryption_Standard>, 11 pages.

Wikipedia, "Cloud computing security," Nov. 30, 2013, <http://en.wikipedia.org/wiki/Cloud_computing_security>, 5 pages.

Wikipedia, "Font substitution," Mar. 16, 2013, <http://en.wikipedia.org/wiki/Font_substitution>, 2 pages.

Wikipedia, "HP ePrint," Dec. 9, 2013, <http://en.wikipedia.org/wiki/HP_ePrint>, 7 pages.

Wikipedia, "Mojibake," Nov. 25, 2013, <http://en.wikipedia.org/wiki/Mojibake>, 8 pages.

Wikipedia, "Portable Document Format," Dec. 7, 2013, <http://en.wikipedia.org/wiki/Pdf>, 26 pages.

Wikipedia, "Rich Text Format," Jan. 8, 2014, <http://en.wikipedia.org/wiki/Rich_Text_Format>, 13 pages.

* cited by examiner

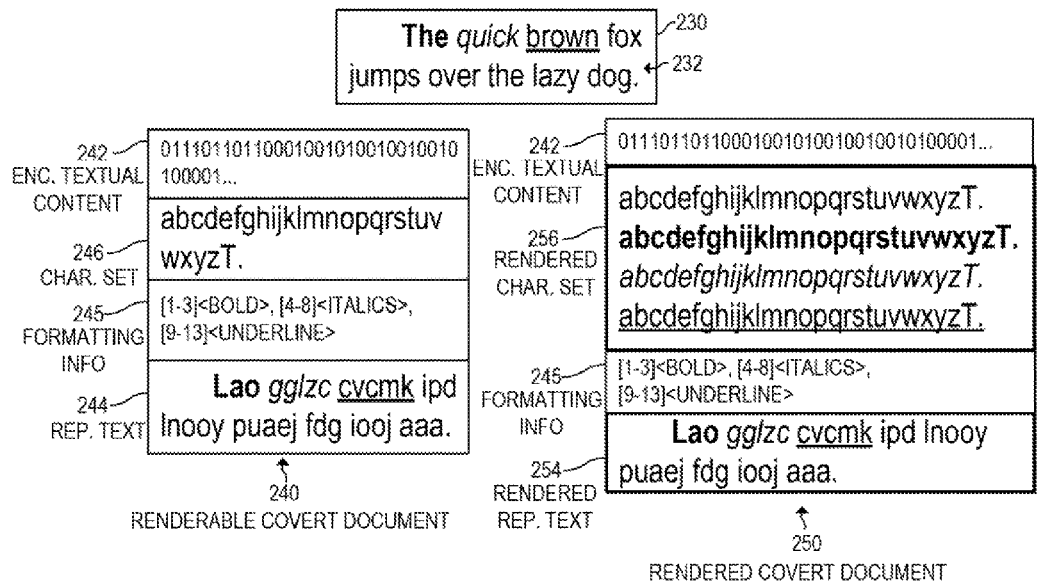
*FIG. 2B*
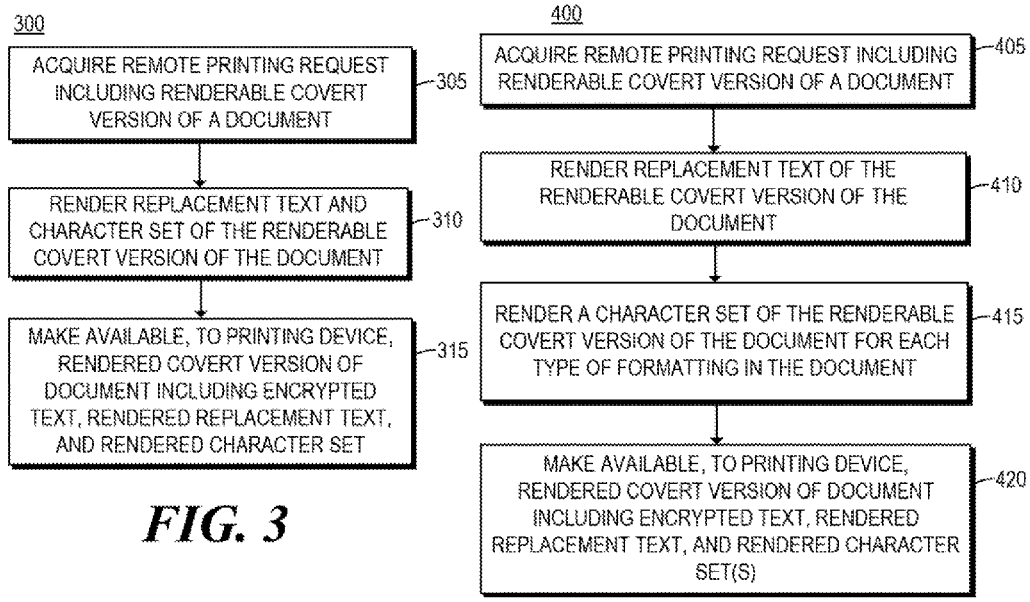
*FIG. 3*
*FIG. 4*

REPLACEMENT TEXT FOR TEXTUAL CONTENT TO BE PRINTED

BACKGROUND

A printing device, such as a printer, multifunction printer (MFP), or the like, may be utilized to print content on a physical medium such as paper. The printing device may receive an electronic representation of the content from a computing device, such as a desktop or laptop computer, connected to the printing device by a direct, wired connection, for example. In some examples, the printing device may be connected to a computer network and may receive content to be printed via the computer network from a computing device that is not directly connected to the printing device.

BRIEF DESCRIPTION OF THE DRAWINGS

The following detailed description references the drawings, wherein:

FIG. 2B is a block diagram of example covert versions of a document preserving formatting of the document;

FIG. 3 is a flowchart of an example method for rendering replacement text for a rendered covert version of a document; and FIG. 4 is a flowchart of an example method for including multiple rendered character sets in a rendered covert version of a document.

DETAILED DESCRIPTION

Figure 1:
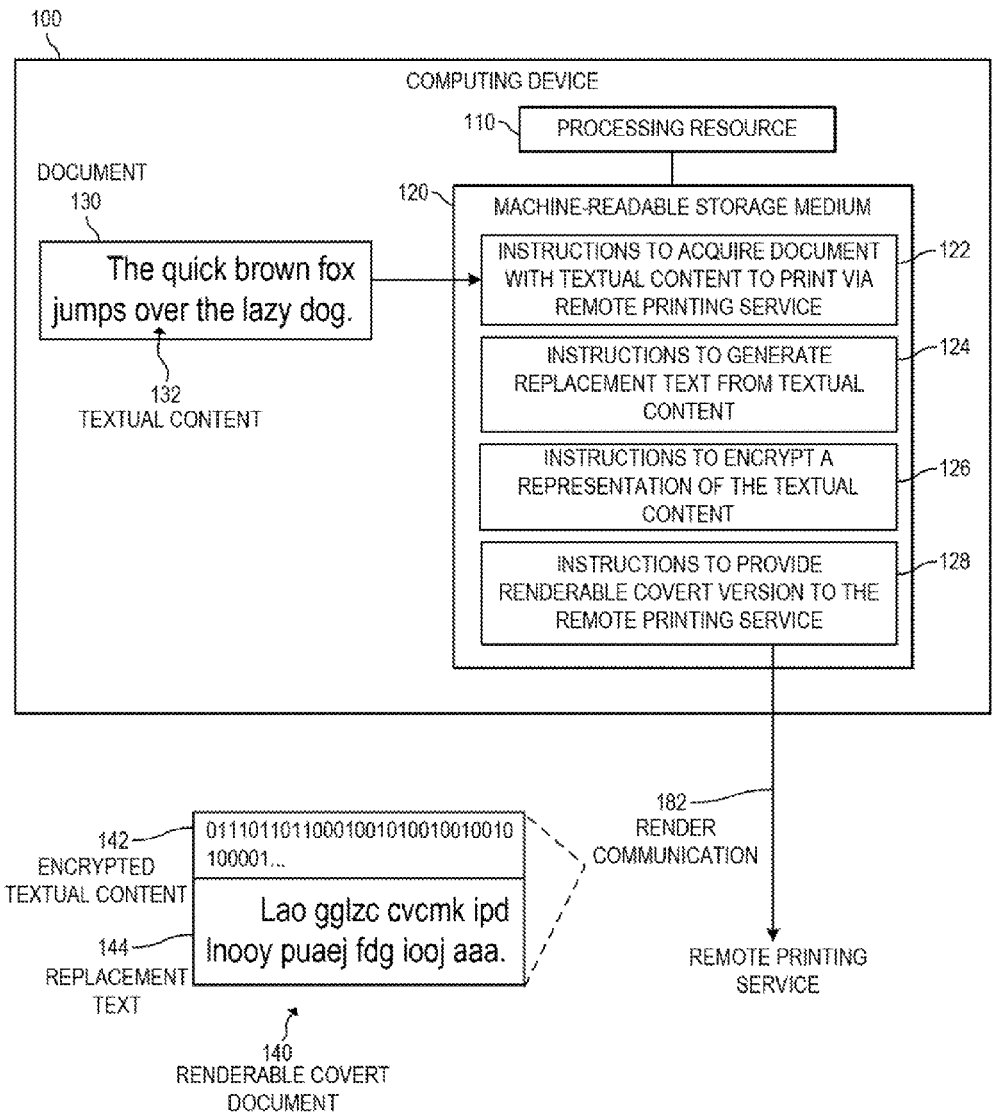
FIG. 1 is a block diagram of an example computing device to generate replacement text from textual content to be printed.

As noted above, a printing device may receive content to be printed via a computer network. For example, the printing device may be a web-connected printing device capable of printing content received via the internet from a remote printing service. In such examples, a computing device (e.g., laptop, smart phone, tablet, etc.) may provide content for printing to a remote printing service via the internet. The content for printing may be provided to the remote printing service in an email including the content (e.g., as an attachment) or as an application programming interface (API) function call, for example.

In some examples, the remote printing service may render the received content to convert it into a format printable by a destination printing device that is to print the content. Once the content is rendered, the remote printing service may provide the rendered content to the destination printing device. In some examples, the remote printing service may render and print the content if the sender of the content is authorized to print on the destination printing device via the remote printing service.

By rendering the content at the remote printing service, a user of a computing device may flexibly print a variety of different types of content (e.g., different document formats, etc.) on a variety of different types of printers (e.g., utilizing different printable formats), without having specialized software installed on the computing device for rendering of each type of content for each type of printing device. However, a user desiring to print private, confidential, or other sensitive text may be hesitant to use such a remote printing service for printing, as the text to be printed may be exposed to the remote printing service during the rendering process described above.

To address these issues, examples described herein may create a renderable covert version of a document to be printed that may be rendered by the remote printing service without exposing the actual text to be printed to the remote printing service. Examples described herein may acquire a document including textual content to be printed at a destination printing device via a remote printing service, the textual content comprising a plurality of first characters. Such examples may generate, from the textual content, replacement text including, for each character of the plurality of first characters, a corresponding second character having a different semantic meaning than the first character. Such examples may further encrypt a representation of the textual content, and provide a renderable covert version of the document, comprising the replacement text and the encrypted representation of the textual content, to the remote printing service in a communication indicating to the print service to render at least the replacement text into a print-ready format for the destination printing device.

In such examples, the replacement text may preserve for rendering at least one of the font, size, and spacing of the characters in the textual content without exposing the actual textual content. In some examples, the remote printing service may render the replacement text into a print-ready format for a destination printing device, without decrypting the encrypted representation of the textual content, such that the actual textual content is not exposed to the remote printing service. In some examples, the remote printing service may further provide a destination printing device with a rendered covert version of the document including the encrypted, non-rendered representation of the textual content and the rendered replacement text. In such examples, the destination printing device may decrypt the non-rendered representation of the textual content, and may generate a rendered version of the textual content by replacing the characters of the rendered replacement text with rendered versions of the characters of the textual content such that the order of the rendered characters in the rendered version of the textual content is the same as the order of the first characters in the decrypted non-rendered representation of the textual content. The destination printing device may then print the rendered version of the textual content.

In some examples, the remote printing service may provide, or the destination printing device may store in local memory, a character set including rendered versions of characters to be used by the destination printing device for substituting the characters of the replacement text with rendered versions of the characters of the actual textual content. In other examples, the renderable covert version may include a character set comprising at least each unique character of the plurality of first characters, which the remote printing service may also render and provide to the destination printing device to use for the substitution to create the rendered version of the textual content.

In this manner, rendering services of the remote printing service may be utilized without exposing the textual content to be printed to the remote printing service. In such examples, computing devices and printing devices without appropriate rendering capabilities may utilize rendering services without exposing the textual content to be printed to the remote printing service.

Referring now to the drawings, FIG. 1 is a block diagram of an example computing device 100 to generate replacement text from textual content to be printed. As used herein, a "computing device" may be a desktop computer, laptop (or notebook) computer, workstation, tablet computer, mobile phone, smart device, server, blade enclosure, or any other processing device or equipment.

In the example of FIG. 1, computing device 100 includes a processing resource 110 and a machine-readable storage medium 120 encoded with instructions 122, 124, 126, and 128 executable by processing resource 110. In some examples, storage medium 120 may include additional instructions. In some examples, instructions 122, 124, 126, and 128, and any other instructions described herein in relation to storage medium 120, may be stored on a machine-readable storage medium remote from but accessible to computing device 100 and processing resource 110 (e.g., via a computer network). In some examples, instructions 122, 124, 126, and 128 may be instructions of a computer program, computer application ("app"), agent, or the like, of computing device 100.

In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In the example of FIG. 1, instructions 122 may actively acquire (e.g., retrieve, etc.) or passively acquire (e.g., receive, etc.) a document 130 including textual content 132 to be printed at a destination printing device via a remote printing service. Document 130 may be any suitable type of electronic file, document, or other electronic representation of the textual content. For example, document 130 may be an electronic word processing file, electronic text file, an email, or the like. In addition to textual content 132, in some examples document 130 may further comprise additional information, such as metadata.

In examples described herein, a 'printing device' may be a hardware device, such as a printer, multifunction printer (MFP), or any other device including at least functionalities to physically produce graphical representation(s) (e.g., text, images, etc.) on paper, or the like. In some examples, an MFP may be capable of performing a combination of multiple different functionalities such as, for example, printing, photocopying, scanning, faxing, etc. In examples described herein, a printing device may be capable of communicating over a computer network, such as the internet, or the like. Such a printing device may be referred to herein as a "web-connected" printing device.

In the example of FIG. 1, the textual content 132 of document 130 comprises a plurality of first characters. For example, the plurality of first characters may comprise each of the characters of textual content 132 ("The quick brown fox jumps over the lazy dog." in the example of FIG. 1).

Instructions 124 may generate, from textual content 132, replacement text 144 including, for each character of the plurality of first characters, a corresponding second character having a different semantic meaning than the first character. For example, instructions 124 may generate replacement text 144 by, for each character of the plurality of first characters of textual content 132, selecting a second character, having a different semantic meaning than the first character, to replace the first character in the replacement text 144. In examples described herein, characters having different semantic meanings may be characters representing different symbols of a language, such as different letters (e.g., the characters "a" and "b"), different symbols of a language, or the like.

For example, in the process of generating replacement text 144 in the example of FIG. 1, instructions 124 may select "L" as a second character to replace "T" of the first characters of textual content 132, select "a" as a second character to replace the "h" (following the "T") of the first characters of textual content 132, and select "o" as a second character to replace the "e" (following the "T" and "h") of the first characters of textual content 132. In such examples, instructions 124 may similarly select corresponding second characters to replace each of the first characters of textual content 132.

In some examples, instructions 124 may, for each character of the plurality of first characters of textual content 132, select a corresponding second character based on dimension(s) of the first character, such as the width of the first character. For example, for each character of the plurality of first characters of textual content 132, instructions 124 may select a corresponding second character having at least one dimension (e.g., a width) that is approximately the same as the same dimension (e.g., the width) of the first character, or otherwise sufficiently similar to the same dimension (e.g., width) of the first character to replace the first character in replacement text 144.

In some examples, instructions 124 may have access to (e.g., on computing device 100 or via a computer network) groups of characters wherein, for each group of characters, the characters of the group are predetermined to have sufficiently similar widths to at least one character to replace the at least one character in a replacement text for given textual content while substantially preserving the spacing of the given textual content.

In such examples, to generate replacement text 144 from textual content 132, instructions 124 may, for each character of the plurality of first characters, select a group of characters predetermined to have respective widths sufficiently similar to a width of the first character to replace the first character in the replacement text, and may select a second character arbitrarily from among the characters of the selected group of characters as a corresponding second character to replace the first character in replacement text 144. For example, for each of the first characters, instructions 124 may select, as the corresponding second character, a character from among the selected group of characters randomly, pseudo-randomly, or in any other arbitrary manner. In some examples, for each first character, the selected group of characters may exclude characters predetermined to have respective widths not sufficiently similar to the width of the first character to replace the first character in the replacement text.

As an example, for a first character "T", instructions 124 may select a group of characters including at least "A", "O", "R", "L", and "M", and may select a character (e.g., "L") from the group arbitrarily as the corresponding second character. As noted above, for each first character, instructions 124 may select a character having a different semantic meaning than the first character. In some examples, the group selected for a given first character may omit the first character, or instructions 124 may select the second character arbitrarily from among the characters of the group having a different semantic meaning than the first character. In some examples, textual content 132 may include multiple occurrences of the same character. In such examples, instructions 124 may select arbitrarily from among the selected group of characters for each occurrence of that character. In such examples, multiple occurrences of the same character in the textual content may be replaced by different second characters in the replacement text. In some examples, different first characters may each be replaced in replacement text 144 with copies of the same character. Although in examples described above, instructions 124 may select a second character to replace a first character based on the width of the second character, in other examples, instructions 124 may select a second character based on width, height, or both.

In the example of FIG. 1, instructions 126 may encrypt a representation of textual content 132, to generate an encrypted representation 142 of textual content 132. Instructions 126 may encrypt a representation of textual content 132 using any suitable encryption technique. For example, instructions 126 may utilize an encryption technique based on or consistent with the Advanced Encryption Standard (AES) (e.g., AES-256, AES-512, etc.), the Data Encryption Standard (DES), Blowfish, or any other suitable encryption technique, standard, or the like.

In some examples, instructions 126 may encrypt the representation of textual content 132 such that a decryption key accessible to the destination printing device is useable to decrypt the encrypted representation 142 of textual content 132. For example, instructions 126 may encrypt the representation of textual content 132 using an encryption key corresponding to a decryption key accessible to the destination printing device such that the decryption key is useable to decrypt the encrypted representation 142. In such examples, the encryption and decryption keys may be the same or different (e.g., symmetric keys). In such examples, the appropriate decryption key may be made available to the destination printing device using any suitable method or technique for exchanging or otherwise making the appropriate keys available to computing device 100 and the destination printing device. In examples described herein, the decryption key is not accessible to the remote printing service. In such examples, instructions 126 may encrypt the representation of textual content 132 such that the encrypted representation 142 may not be decrypted by the remote printing service.

Instructions 128 may provide, to the remote printing service, a renderable covert version 140 of document 130. In examples described herein, a "covert" version of a document including textual content is a version of the document in which the textual content is obscured such that it is not exposed to a remote printing service to render portions of the version of the document. Renderable covert version 140 may comprise replacement text 144 and the encrypted representation 142 of textual content 132. Instructions 128 may provide the renderable covert version 140 to the remote printing service in a communication 182 indicating to the remote print service to render at least the replacement text into a print-ready format for the destination printing device.

The communication 182 may be any suitable message(s) in response to which the remote printing service is to at least render at least a portion of the content of communication 182. Such a communication may be referred to herein as a "remote printing request." In some examples, the communication 182 may also indicate to the remote printing service to provide at least the rendered content to a destination printing device. For example, communication 182 may comprise an email message including the renderable covert version 140 (e.g., as an attachment) and comprising information indicating that the remote printing service is to at least render at least a portion of the content of communication 182. For example, the information may be a destination address associated with a web-connected destination printing device to which the remote printing service may print. In response to an email message with such a destination address, the remote printing service may render at least a portion of the content of communication 182 (e.g., replacement text 144) and provide at least some information of communication 182 or a version thereof (e.g., the rendered content) to the specified destination printing device. In other examples, communication 182 may comprise at least one API function call, such as a call to a print request function of an API of the remote printing service, that may cause the remote printing service to render at least a portion of the content of communication 182 (e.g., replacement text 144) and provide at least some information of communication 182 or a version thereof (e.g., the rendered content) to the destination printing device.

In some examples, encrypted representation 142 of textual content 132 may be included in a header of renderable covert version 140. In some examples, the remote printing service may not render (or may not attempt to render) encrypted representation 142 either because encrypted representation 142 is included in the header of version 140, because encrypted representation 142 is encrypted such that the remote printing service is prevented from rendering textual content 132 based on encrypted representation 142, or both. The renderable covert version 140 of document 130 may include replacement text 144 in cleartext (i.e., not encrypted) and in the body of version 140 such that replacement text 144 is renderable by the remote printing service.

In examples described herein, a "remote printing service" may be a service implemented by one or more networked computing devices to receive a remote printing request from a sending computing device and provide content associated with the request to a destination printing device, wherein the sending computing device and the printing device are each remote from the networked computing device(s) implementing the remote printing service. In examples described herein, first computing device "remote" from a second computing device may be a first computing device that is separate from, and not directly connected to, the second computing device, wherein the first and second computing devices may access one another over a computer network. As used herein, a computer network may include, for example, a local area network (LAN), a wireless local area network (WLAN), a virtual private network (VPN), the Internet, or the like, or a combination thereof. In some examples, a computer network may include a telephone network (e.g., a cellular telephone network).

In examples described herein, content in a "print-ready" format for a given printing device may be a version of the content in a format that the given printing device is able to print. For example, a given printing device may be able to print documents in one or more of portable document format (PDF), at least one version of printer command language (PCL) format (e.g., PCL3GUI, etc.), or the like. A document in any such format that may be printed by a given printing device may be considered to be in a "print-ready" format for that printing device. In examples described herein, to "render" content is to convert the content into a print-ready format for at least one particular printing device, such as at least one destination printing device.

A document in a format that may not be printed by a given printing device may not be considered a print-ready version of the document. For example, if a given printing device is not able to print a document in word processing file format, then any document in the word processing file format may not be considered to be in a print-ready format for the given printing device. In such examples, the document may be rendered (converted, or the like) into a print-ready format for the destination printing device before being made available to the printing device. In such examples, the remote printing service may render the document to produce a version in the print-ready format to provide to the printing device.

As described above, instructions 124 may generate, from textual content 132, replacement text 144 including, for each character of the plurality of first characters of textual content 132, a corresponding second character having a different semantic meaning than the first character. In some examples, the plurality of first characters may include the alphanumeric characters of textual content 132, excluding any punctuation in textual content 132. In other examples, the first characters may include alphanumeric characters and punctuation of textual content 132, such that replacement text 144 includes replacement second characters for alphanumeric and punctuation characters of textual content 132. In some examples, instructions 124 may replace spaces in textual content 132 with alphanumeric second characters in replacement text 144. In some examples, instructions 124 may generate replacement text 144 by, for each first alphanumeric or punctuation character of the plurality of textual content 132, selecting a second character, having a different semantic meaning than the first character, to replace the first character in the replacement text 144, and replacing spaces in textual content 132 with alphanumeric second characters.

In some examples, instructions 122, 124, 126, and 128, may be part of an installation package that, when installed, may be executed by processing resource 110 to implement the functionalities described herein in relation to instructions 122, 124, 126, and 128. In such examples, storage medium 120 may be a portable medium, such as a CD, DVD, or flash drive, or a memory maintained by a server from which the installation package can be downloaded and installed. In other examples, instructions 122, 124, 126, and 128 may be part of an application, applications, or component already installed on remote printing server 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2A-4.

Figure 2A:
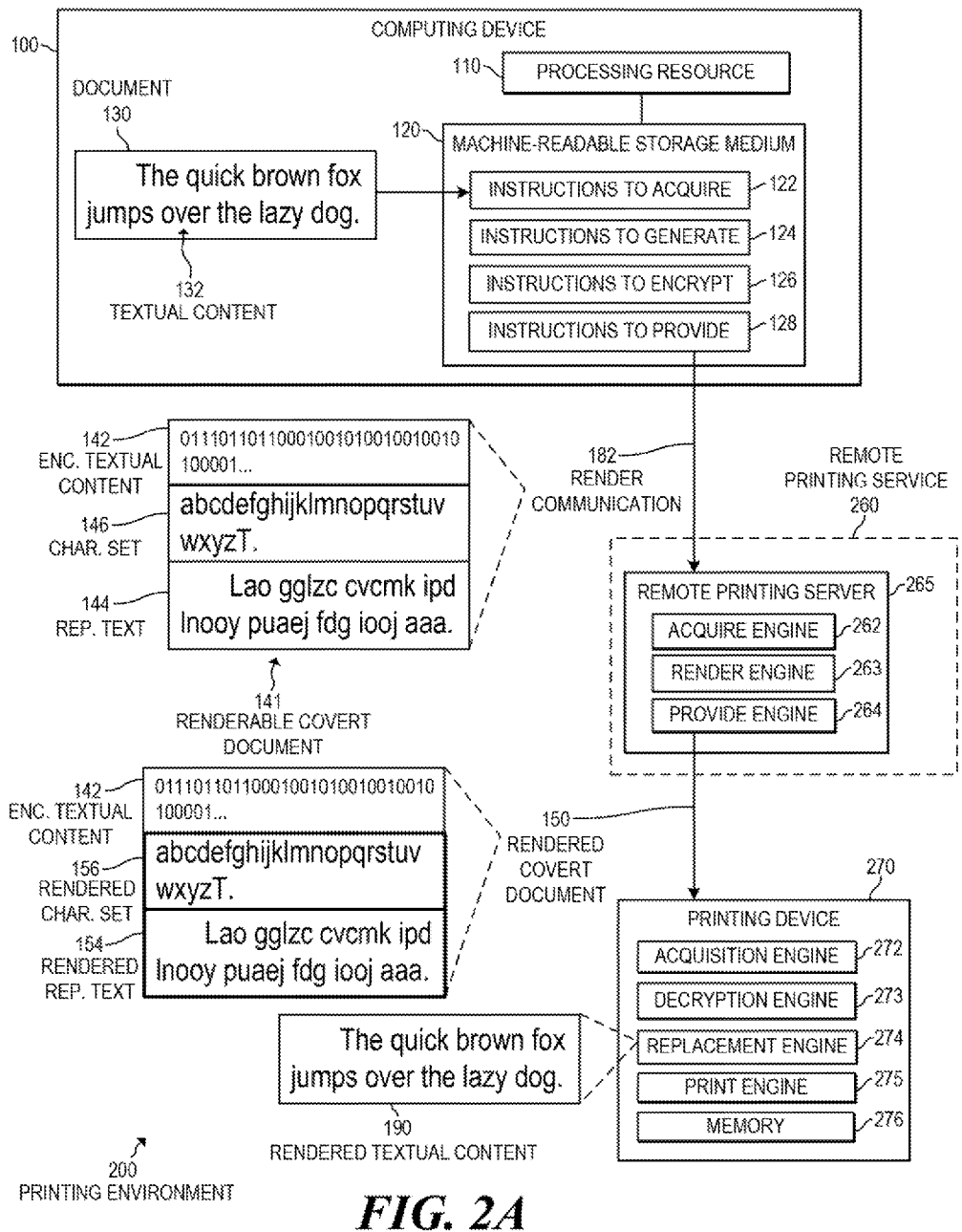
FIG. 2A is a block diagram of an example printing environment to generate a rendered version of textual content from a rendered covert version of a document.

FIG. 2A is a block diagram of an example printing environment 200 to generate a rendered version of textual content from a rendered covert version of a document. In the example of FIG. 2A, printing environment 200 comprises computing device 100, as described above in relation to FIG. 1, a remote printing service 260, and a printing device 270. In some examples, remote printing service 260 may be implemented by one or more computing devices, including one or more remote printing servers. In the example of FIG. 2A, remote printing service is at least partially implemented by a computing device 265, which may be a remote printing server 265.

In the example of FIG. 2A, remote printing server 265 includes at least engines 262-264. Each of engines 262-264, and any other engines of server 265, may be any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 262-264. In such examples, server 265 may include the machine-readable storage medium storing the instructions and the processing resource to execute the instructions, or the machine-readable storage medium may be separate but accessible to server 265 and the processing resource.

In some examples, the instructions can be part of an installation package that, when installed, can be executed by the processing resource to implement engines 262-264. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on server 265 including the processing resource. In such examples, the machine-readable storage medium may include memory such as a hard drive, solid state drive, or the like. In other examples, the functionalities of any engines of server 265 may be implemented in the form of electronic circuitry.

In the example of FIG. 2A, instructions 122 of computing device 100 may acquire a document 130 including textual content 132 to be printed at a destination printing device (e.g., printing device 270) via remote printing service 260. As described above in relation to FIG. 1, instructions 124 may generate, from textual content 132, replacement text 144 including, for each character of the plurality of first characters of textual content 132, a corresponding second character having a different semantic meaning than the first character. In the example of FIG. 2A, instructions 124 may also generate, from textual content 132, a character set 146 comprising at least each unique character of the plurality of first characters of textual content 132.

Instructions 126 may encrypt a representation of textual content 132 to generated encrypted representation 142 of textual content 132, as described above. In the example of FIG. 2A, instructions 128 may provide, to remote printing service 260, a renderable covert version 141 of document 130. The renderable covert version 141 may comprise replacement text 144 and the encrypted representation 142 of textual content 132, as described above, and the generated character set 146. In the example of FIG. 2A, the encrypted representation 142 is an encrypted version of a non-rendered (e.g., not print-ready for printing device 270) version of textual content 132. Instructions 128 may provide the renderable covert version 141 to remote printing service 260 in a communication 182 indicating to the remote print service to render at least the replacement text into a print-ready format for destination printing device 270, as described above.

In such examples, acquire engine 262 of server 265 may actively or passively acquire a remote printing request (e.g., communication 182) including the renderable covert version 141 of document 130. Render engine 263 may render replacement text 144 and character set 164 into a print-ready format for destination printing device 270, to generate rendered replacement text 154 and rendered character set 156. Render engine 263 may render replacement text 144 and character set 164 without decrypting the encrypted representation 142 of textual content 132. In some examples, remote printing service 260 may not render (or may not attempt to render) encrypted representation 142, as described above in relation to FIG. 1.

In the example of FIG. 2, provide engine 264 may make available, to destination printing device 270, a rendered covert version 150 of document 130, the rendered covert version 150 including the encrypted, non-rendered representation 142 of textual content 132, rendered replacement text 154, and rendered character set 156. In some examples, engine 264 may make version 150 available to printing device 270 either actively (e.g., by providing, sending, pushing, etc., version 150 to printing device 270) or passively (e.g., by making version 150 available for printing device 270 to retrieve, pull, etc., from service 260).

In the example of FIG. 2A, printing device 270 includes at least engines 272-274. Each of the engines of printing device 270 may be any combination of hardware and programming to implement the functionalities of the respective engine, as described above in relation to engines of server 265. In other examples, the functionalities of any of the engines of printing device 270 may be implemented in the form of electronic circuitry. In the example of FIG. 2A, printing device 270 further includes a print engine 275. Print engine 275 may comprise hardware or any combination of hardware and programming to implement the functionalities described herein in relation to engine 275, including at least hardware to physically produce graphical representation(s) (e.g., text, images, etc.) on paper, or the like.

In the example of FIG. 2A, acquisition engine 272 may actively or passively acquire, from remote printing service 260, a rendered covert version 150 of document 130. In the example of FIG. 2A, rendered covert version 150 includes an encrypted, non-rendered representation 142 of textual content 132, rendered replacement text 154, and rendered character set 156. In FIG. 2A, portions of rendered covert version 150 that are rendered into print-ready format for destination printing device 270 are indicated by bold outlines.

Decryption engine 273 may decrypt the encrypted, non-rendered representation 142 of textual content 132 to obtain a cleartext, non-rendered (i.e., not print-ready for printing device 270) version of textual content 132. Engine 273 may decrypt the encrypted representation 142 using a decryption key accessible to printing device 270, as described above. In such examples, the decryption key may be stored in memory 276 of printing device 270, or may be stored remotely from but accessible to printing device 270. Memory 276 may be implemented by at least one machine-readable storage medium.

Replacement engine 274 may generate a rendered version 190 of textual content 132, having a print-ready format for printing device 270, by replacing the rendered second characters of rendered replacement text 154 with rendered versions of the first characters, such that the order of the rendered versions of the first characters in the rendered version 190 of textual content 132 is the same as (i.e., matches) the order of the first characters in the decrypted non-rendered representation of textual content 132 decrypted by engine 273. In some examples, in response to the generation of rendered version 190 of textual content, print engine 275 may print the rendered version 190 of textual content 132.

In some examples, replacement engine 274 may implement replacement logic to replace each rendered second character of rendered replacement text 154 with the appropriate rendered first character based on the order of characters present in the decrypted representation of textual content 132 obtained by decryption engine 273 decrypting the encrypted representation 142 of textual content 132. In the example of FIG. 2A, engine 274 may replace each rendered second character of rendered replacement text 154 with the appropriate rendered character of rendered character set 156, based on the order of characters in the decrypted representation of textual content 132.

In the example of FIG. 2A, for example, engine 274 may replace "L", "a", and "o" (the first three rendered characters of rendered replacement text 154) with rendered versions of "T", "h", and "e", respectively, (the first three characters of the decrypted representation of textual content 132), to obtain the first three rendered characters of rendered textual content 190 (matching the first three characters of textual content 132). In this manner, engine 274 may replace each of the rendered characters of rendered replacement text 154 with the appropriate rendered character based on the order of the character in the decrypted representation of textual content 132, such that the order of rendered characters of rendered textual content 190 is the same as the order of characters of textual content 132 of document 130 (i.e., such that the rendered text of rendered textual content 190 is the same as the text of textual content 132).

In this manner, engine 274 may replace each of the rendered second characters of rendered replacement text 154 with rendered first characters based on the respective order of characters in each of rendered replacement text 154 and the decrypted, non-rendered representation of textual content 132 to generate rendered textual content 190 such that the text of rendered textual content 190 is the same as the text of textual content 132.

In the example of FIG. 2A, the rendered characters used to replace the characters of rendered replacement text 154 (and thereby generate rendered textual content 190) may be taken from rendered character set 156 of rendered covert version 150. In the example of FIG. 2A, characters set 146 and rendered character set 156 each include one of each unique character used in textual content 132. In other examples, characters set 146 and rendered character set 156 may each include additional alphanumeric characters, symbols, punctuation not used in textual content 132. In some examples, characters set 146 and rendered character set 156 may each include a full alphabet for the language of textual content 132, a full uppercase alphabet for the language of textual content 132, a full lowercase alphabet for the language of textual content 132, each numeral of the language of textual content 132, all or a subset of the punctuation of the language of textual content 132, or any combination of at least portion(s) thereof.

As noted above, in the example of FIG. 2A, the rendered characters used to replace the characters of rendered replacement text 154 (and thereby generate rendered textual content 190) may be taken from rendered character set 156 of rendered covert version 150. In other examples, character set 146 may be omitted from the renderable cover version of document 130 (see version 140 of FIG. 1). In such examples, rendered character set 156 may also be omitted from the rendered covert version 150 of document 130. In such examples, at least one of remote printing service 260 and memory of printing device 270 may store a rendered character set 156 including rendered versions of a full alphabet for the language of textual content 132, a full uppercase alphabet for the language of textual content 132, a full lowercase alphabet for the language of textual content 132, each numeral of the language of textual content 132, all or a subset of the punctuation of the language of textual content 132, or any combination of at least portion(s) thereof.

In examples in which the rendered character set 156 is stored at remote printing service 260, acquisition engine 272 may actively or passively acquire rendered versions of the first characters of textual content 132 from remote printing service 260. For example, engine 272 may acquire a rendered character set 156, as described above, (including the rendered versions of the first characters) from remote printing service 260 with or separately from a rendered covert version of document 130 omitting any rendered character set. In such examples, replacement engine 274 may replace the rendered second characters of rendered replacement text 154 with the rendered versions of the first characters of the rendered character set 156 acquired from remote printing service 260. In examples in which the rendered character set 156 (i.e., the rendered versions of the first characters) are stored in memory 276 of printing device 270, replacement engine 274 may replace the rendered second characters of rendered replacement text 154 with rendered versions of the first characters of the rendered character set 156 stored in memory 276.

In some examples, replacement text 144 may include second characters to replace spaces in textual content 132. In such examples, engine 274 may replace such rendered second characters with spaces, according to the placement of spaces in the decrypted, non-rendered textual content 132. In some examples, functionalities described herein in relation to FIG. 2A may be provided in combination with functionalities described herein in relation to any of FIGS. 1 and 2B-4.

FIG. 2B is a block diagram of example covert versions of a document preserving formatting of the document. The example of FIG. 2B is described herein with reference to printing environment set 200 of FIG. 2A. In the example of FIG. 2B, a document 230 includes textual content 232 with various types of text formatting. For example, in textual content 232, the first word ("The") is represented in bold text, the second word ("quick") is represented in italics, and the third word ("brown") is represented as underlined.

In some examples, printing environment 200 may preserve the formatting represented in document 230 in the renderable covert version generated by computing device 100 and the rendered covert version generated by remote printing service 260. In such examples, instructions 122 of computing device 100 may acquire a document 230 including textual content 232 to be printed at destination printing device 270 via remote printing service 260. As described above in relation to FIG. 1, instructions 124 may generate, from textual content 232, replacement text 244 for a renderable covert document 240 illustrated in FIG. 2B. Replacement text 244 includes, for each character of the plurality of first characters of textual content 232, a corresponding second character having a different semantic meaning than the first character. In the example of FIG. 2B, instructions 124 may further generate replacement text 244 such that the second characters of replacement text 244 retain the formatting of the corresponding first characters as represented in textual content 232 of document 230. For example, in replacement text 244 of FIG. 2B, the first three characters are bold, the next five characters are italicized, and the next five characters are underlined, like the corresponding characters of textual content 232 of document 230.

In the example of FIG. 2B, instructions 124 may further generate, from document 230, formatting information 245 for textual content 232 indicating the respective formatting of the first characters as represented in textual content 232 of document 230. For example, formatting information 245 of FIG. 2B indicates that, in textual content 232 of document 230, characters 1-3 are bold, characters 4-8 are italicized, and characters 9-13 are underlined. In examples described herein, formatting information 245 may be represented in any suitable manner, format, etc.

In the example of FIG. 2B, instructions 124 may also generate, from textual content 232, a character set 246 comprising at least each unique character of the plurality of first characters of textual content 232. In some examples, character set 246 may comprise additional characters, as described above in relation to character sets 146 and 156 of FIG. 2A. Instructions 126 may encrypt a representation of textual content 232 to generate an encrypted, non-rendered representation 242 of textual content 232, as described above.

In the example of FIG. 2B, instructions 128 may provide, to remote printing service 260, a renderable covert version 240 of document 230. The renderable covert version 240 may comprise replacement text 244, character set 246, and the encrypted representation 242 of textual content 232, as described above, and formatting information 245. Instructions 128 may provide the renderable covert version 240 to remote printing service 260 in a communication indicating to the remote print service to render at least the replacement text into a print-ready format for destination printing device 270, as described above.

In the example of FIG. 2B, render engine 263 of server 263 may render replacement text 244 into a print-ready format for destination printing device 270, to generate rendered replacement text 254 for a rendered covert version 250 of document 230 illustrated in FIG. 2B. In the example of FIG. 2B, for each type of formatting utilized by at least one of the first characters as represented in document 230, render engine 263 may render, into print-ready format for destination printing device 270, a respective copy or character set 246 with the respective type of formatting.

For example, in the example of FIG. 2B, formatting information 245 indicates that three types of text formatting are utilized in textual content 232 of document 230 (i.e., bold, italics, and underlining). In such examples, render engine 263 may generate rendered character sets 256, for the rendered covert version 250 of document 230, by rendering each of: a first, default version of character set 246 including none of the indicated types of formatting; a second, bold version of character set 246; a third, italicized version of character set 246; and a fourth, underlined version of character set 246. In such examples, rendered covert version 250 of document 230 may include each of the four versions of the rendered character set among rendered character sets 256 of rendered covert version 250 of document 230. While three types of formatting and four rendered character sets are illustrated in the example of FIG. 2B, in other examples, a different number of formatting types and rendered character sets may be used (i.e., more or fewer). In FIG. 2B, portions of rendered covert version 250 that are rendered into print-ready format for destination printing device 270 are indicated by bold outlines.

In the example of FIG. 2B, the rendered covert version 250 of document 230 may include rendered replacement text 254, rendered character sets 256, encrypted representation 242 of textual content 232, and formatting information 245 for the textual content indicating at least one type of formatting of at least one of the plurality of first characters of textual content 232, as represented in document 230.

In some examples, acquisition engine 272 of printing device 270 may acquire rendered covert version 250, and decryption engine 273 may decrypt the encrypted representation 242 of textual content 232, as described above. In such examples, replacement engine 274 may generate a rendered version of textual content 232, having a print-ready format for printing device 270 and including the same text and formatting as textual content 232, by replacing the rendered second characters of rendered replacement text 254 with rendered versions of the appropriately formatted first characters, such that the order of the rendered versions of the first characters in the rendered version of textual content 232 is the same as (i.e., matches) the order of the first characters in the decrypted, non-rendered representation of textual content 232 decrypted by engine 273. In some examples, in response to the generation of rendered version 190 of textual content, print engine 275 may print the rendered version 190 of the textual content.

In some examples, the replacement logic of engine 274 may replace the rendered second characters of replacement text 244 with the appropriate rendered first characters as described above, except that, for each second character to be replaced, the appropriately formatted rendered first character is chosen from among the multiple rendered character sets 256, based on the formatting indicated for the first character in formatting information 245 of the rendered covert version 250 of document 230. In some examples, functionalities described herein in relation to FIG. 2B may be provided in combination with functionalities described herein in relation to any of FIGS. 1-2A and 3-4.

FIG. 3 is a flowchart of an example method 300 for rendering replacement text for a rendered covert version of a document. Although execution of method 300 is described below with reference to remote printing server 265 of FIG. 2A described above, other suitable systems for the execution of method 300 can be utilized. Additionally, implementation of method 300 is not limited to such examples.

At 305 of method 300, acquire engine 262 of remote printing server 265 (at least partially implementing a remote printing service 260) may acquire a remote printing request (e.g., communication 182) including a renderable covert version 141 of a document 130 including textual content 132 to be printed. The renderable covert version 150 may comprise an encrypted, non-rendered representation 142 of the textual content 132 to be printed, replacement text 144 comprising, for each character of a plurality of first characters of textual content 132, a respective second character having a different semantic meaning than the first character, and a character set 146 comprising at least each unique character of the plurality of first characters of textual content 132.

At 310, render engine 263 of server 265 may render, into a print-ready format for a destination printing device 270, replacement text 144 and character set 146, without decrypting the encrypted representation 142 of textual content 132. At 315, provide engine 264 may make available, to destination printing device 270, a rendered covert version 150 of document 130 including the encrypted, non-rendered representation 142 of textual content 132, the rendered replacement text 154, and the rendered character set 156.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2B and 4.

FIG. 4 is a flowchart of an example method 400 for including multiple rendered character sets in a rendered covert version of a document. Although execution of method 400 is described below with reference to remote printing server 265 of FIG. 2A described above, other suitable systems for the execution of method 400 can be utilized. Additionally, implementation of method 400 is not limited to such examples. Method 400 is described below with reference to examples of FIGS. 2A and 2B.

At 405 of method 400, acquire engine 262 of remote printing server 265 (at least partially implementing a remote printing service 260) may acquire a remote printing request (e.g., communication 182) including a renderable covert version 240 of a document 230 including textual content 232 to be printed. The renderable covert version may comprise an encrypted, non-rendered representation 242 of the textual content 232 to be printed, replacement text 244 comprising, for each character of a plurality of first characters of textual content 232, a respective second character having a different semantic meaning than the first character, and a character set 246 comprising at least each unique character of the plurality of first characters of textual content 232. In some examples, the renderable covert version 240 of document 230 further comprises formatting information 245 for textual content 232 indicating at least one type of formatting of at least one of the plurality of first characters, as represented in document 230.

At 410, render engine 263 of server 265 may render replacement text 244 into a print-ready format for a destination printing device 270 without decrypting the encrypted representation 242 of textual content 232. At 415, for each type of formatting utilized by at least one of the first characters of textual content 232 as represented in document 230, render engine 263 may render, into print-ready format for destination printing device 270, a respective copy of character set 246 with the respective type of formatting, as described above in relation to FIG. 2B.

At 240, provide engine 264 may make available, to destination printing device 270, a rendered covert version 250 of document 230 including at least the encrypted, non-rendered representation 242 of textual content 232, the rendered replacement text 254, and each of the rendered character sets 256. In some examples, a rendered covert version 250 may also include formatting information 245.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3.

What is claimed is:

1. A non-transitory machine-readable storage medium comprising instructions executable by a processing resource of a computing device to:
   acquire a document including textual content to be printed at a destination printing device via a remote printing service, the textual content comprising a plurality of first characters;
   generate, from the textual content, replacement text including, for each character of the plurality of first characters, a corresponding second character having a different semantic meaning than the first character;
   encrypt a representation of the textual content;
   provide a renderable covert version of the document, comprising the replacement text and the encrypted representation of the textual content, to the remote printing service in a communication indicating to the remote print service to render at least the replacement text into a print-ready format for the destination printing device, wherein the renderable covert version of the document includes the replacement text in cleartext such that the replacement text is renderable by the remote printing service; the encrypted representation of the textual content is encrypted such that the remote printing service is prevented from rendering the textual content; and the instructions to encrypt comprise instructions to encrypt the representation of the textual content such that a decryption key accessible to the destination printing device is useable to decrypt the encrypted representation of the textual content.

2. The storage medium of claim 1, wherein the instructions to generate comprise instructions to:
   generate, from the textual content, a character set comprising at least each unique character of the plurality of first characters;
   wherein the renderable covert version of the document further comprises the character set.

3. The storage medium of claim 2, wherein the instructions to generate comprise instructions to:
   generate, from the document, formatting information for the textual content indicating the respective formatting of the first characters as represented in the textual content of the document;
   wherein the renderable covert version of the document further comprises the formatting information; and
   wherein the second characters of the replacement text retain the formatting of the corresponding first characters as represented in the textual content of the document.

4. The storage medium of claim 1, wherein the instructions to generate the replacement text comprise instructions to, for each character of the plurality of first characters:
   select the corresponding second character based on the width of the first character.

5. The storage medium of claim 1, wherein the instructions to generate the replacement text comprise instructions to, for each character of the plurality of first characters:
   select a group of characters predetermined to have respective widths sufficiently similar to a width of the first character to replace the first character, the selected group of characters excluding characters predetermined to have respective widths not sufficiently similar to the width of the first character; and
   select the corresponding second character arbitrarily from among the characters of the selected group of characters.

6. The storage medium of claim 1, wherein the instructions to generate the replacement text comprise instructions to:
   replace spaces in the textual content with alphanumeric characters in the replacement text;
   wherein the first characters include alphanumeric characters and punctuation.

7. A printing device comprising:
   a hardware processor;
   an acquisition engine to acquire, from a remote printing service, a rendered covert version of a document including an encrypted, non-rendered representation of textual content to be printed, and a rendered character set comprising at least the rendered version of each unique character of the plurality of first characters, and rendered replacement text comprising, for each character of a plurality of first characters of the textual content, a corresponding rendered second character having a different semantic meaning than the first character,
   a decryption engine to decrypt the non-rendered representation of the textual content; and
   a replacement engine to generate a rendered version of the textual content, having a print-ready format for the printing device, by replacing the rendered second characters of the rendered replacement text with rendered versions of the first characters, such that the order of the rendered versions of the first characters in the rendered version of the textual content is the same as the order of the first characters in the decrypted non-rendered representation of the textual content.

8. The printing device of claim 7, further comprising:
   a print engine to, in response to the generation of the rendered version of textual content, print the rendered version of the textual content.

9. The printing device of claim 7, wherein:
   the rendered covert version of the document includes formatting information for the textual content indicating at least one type of formatting of at least one of the plurality of first characters, as represented in the document.

10. The printing device of claim 7, wherein:
    the acquisition engine is further to acquire the rendered versions of first characters from the remote printing service; and
    the replacement engine is to replace the rendered second characters of the rendered replacement text with the rendered versions of the first characters acquired from the remote printing service.

11. The printing device of claim 7, further comprising:
    memory to store the rendered versions of first characters:
    wherein the replacement engine is to replace the rendered second characters of the rendered replacement text with rendered versions of the first characters stored in the memory.

12. A method performed by a remote printing server at least partially implementing a remote printing service, the method comprising:
    acquiring, with the remote printing server, a remote printing request including a renderable covert version of a document comprising:
       an encrypted, non-rendered representation of textual content to be printed;
       replacement text comprising, for each character of a plurality of first characters of the textual content, a respective second character having a different semantic meaning than the first character; and a character set comprising at least each unique character of the plurality of first characters; and rendering, into a print-ready format for a destination printing device, the replacement text and the character set without decrypting the encrypted representation of the textual content; and providing to the destination printing device, a rendered covert version of the document including the encrypted, non-rendered representation of the textual content, the rendered replacement text, and the rendered character set, wherein the rendered character set comprises at least the rendered version of each unique character of the plurality of first characters.

13. The method of claim 12, wherein:

the renderable covert version of the document further comprises formatting information for the textual content indicating at least one type of formatting of at least one of the plurality of first characters, as represented in the document;

for each type of formatting utilized by at least one of the first characters as represented in the document, rendering, into print-ready format for the destination printing device, a respective copy of the character set with the respective type of formatting; and including each of the rendered character sets in the rendered covert versions of the document.

* * * * *

UNITED STATES PATENT AND TRADEMARK OFFICE
CERTIFICATE OF CORRECTION

PATENT NO. : 9,916,464 B2
APPLICATION NO. : 15/116077
DATED : March 13, 2018
INVENTOR(S) : Prashant Asthana et al.

Page 1 of 1

It is certified that error appears in the above-identified patent and that said Letters Patent is hereby corrected as shown below:

In the Claims

Column 16, Claim 7, Line 20, delete "character," and insert -- character; --, therefor.

Column 17, Claim 12, Line 7, delete "providing" and insert -- providing, --, therefor.

Signed and Sealed this
Tenth Day of December, 2019

Andrei Iancu
*Director of the United States Patent and Trademark Office*